United States Patent
Holzer et al.

(10) Patent No.: US 6,844,079 B2
(45) Date of Patent: Jan. 18, 2005

(54) FILM HAVING AN IMPROVED SEALABILITY AND ADHERENCE

(75) Inventors: Susanne Holzer, Ottweiler (DE); Gerhard Wieners, Frankfurt (DE)

(73) Assignee: Trespaphen GmbH (DE)

( * ) Notice: Subject to any disclaimer, the term of this patent is extended or adjusted under 35 U.S.C. 154(b) by 0 days.

(21) Appl. No.: 10/478,929

(22) PCT Filed: May 31, 2002

(86) PCT No.: PCT/EP02/05946
§ 371 (c)(1),
(2), (4) Date: Nov. 25, 2003

(87) PCT Pub. No.: WO02/098658
PCT Pub. Date: Dec. 12, 2002

(65) Prior Publication Data
US 2004/0146730 A1 Jul. 29, 2004

(30) Foreign Application Priority Data
Jun. 2, 2001 (DE) .......... 101 27 038

(51) Int. Cl.⁷ .............................. B32B 27/30
(52) U.S. Cl. ............... 428/520; 428/910; 428/354; 428/213; 156/308.2; 156/327; 156/DIG. 1; 156/DIG. 5
(58) Field of Search ............ 428/520, 910, 428/354, 213; 156/308.2, 327, DIG. 1, DIG. 2

(56) References Cited

U.S. PATENT DOCUMENTS

| | | | | |
|---|---|---|---|---|
| 3,655,504 A | | 4/1972 | Mueller-Tamm et al. | |
| 3,900,635 A | * | 8/1975 | Funderburk et al. | ........ 428/213 |
| 4,409,286 A | | 10/1983 | Decroix | |
| 4,629,657 A | * | 12/1986 | Gulati et al. | ............... 428/461 |
| 5,079,072 A | * | 1/1992 | Christopherson | ............ 428/213 |
| 5,492,757 A | * | 2/1996 | Schuhmann et al. | ........ 428/329 |
| 5,501,905 A | | 3/1996 | Krallmann et al. | |
| 6,042,930 A | | 3/2000 | Kelch et al. | |
| 6,194,040 B1 | * | 2/2001 | Delius et al. | ............... 428/34.8 |
| 6,214,477 B1 | * | 4/2001 | Wofford et al. | ............. 428/518 |
| 6,777,047 B1 | * | 8/2004 | Tatarka et al. | ............. 428/35.7 |
| 2002/0055006 A1 | * | 5/2002 | Vogel et al. | ............... 428/520 |
| 2004/0028932 A1 | * | 2/2004 | Holzer et al. | ............... 428/515 |
| 2004/0033378 A1 | * | 2/2004 | Holzer et al. | ............. 428/484.1 |
| 2004/0048086 A1 | * | 3/2004 | Kennedy et al. | ............. 428/517 |
| 2004/0146730 A1 | * | 7/2004 | Holzer et al. | ............... 428/515 |

FOREIGN PATENT DOCUMENTS

| | | |
|---|---|---|
| DE | 1 769 434 | 7/1971 |
| DE | 26 07 326 | 9/1976 |
| EP | 0065898 | 1/1982 |
| EP | 0 356 220 | 2/1990 |
| EP | 0 616 885 | 9/1994 |
| EP | 0 620 111 | 10/1994 |
| GB | 1 534 001 | 11/1978 |
| GB | 2223446 | 11/1990 |

* cited by examiner

*Primary Examiner*—D. Lawrence Tarazano
(74) *Attorney, Agent, or Firm*—Connolly Bove Lodge & Hutz LLP

(57) ABSTRACT

A multilayer biaxially oriented, polyolefin film consisting of a base layer, at least one first intermediate layer and a first cover layer that is applied to said intermediate layer. The first intermediate layer is made of a terpolymer consisting of three different monomers (a), (b) and (c): whereby (a) is an olefin, (b) is an unsaturated carboxylic acid or esters thereof, and (c) is an unsaturated carboxylic acid or carboxylic acid ester, which is different from (b), or is a carboxylic acid anhydride. In addition, the first cover layer contains a copolymer, and a top layer comprising a copolymer of an olefin, and an unsaturated carboxylic acid or esters thereof, and the first cover layer additionally contains an additive.

49 Claims, No Drawings

FILM HAVING AN IMPROVED SEALABILITY AND ADHERENCE

The invention relates to a film made from thermoplastics having a low sealing initiation temperature and improved sealability and varied adherence. The film adheres to materials which are not based on plastics, such as, for example, glass, metal and wood, but also to various polymers, such as, for example, PS, PET and PO. The invention also relates to the use of the film and to a process for the production thereof. The film can be employed universally for various applications, such as, for example, in the packaging sector, for labelling and protective lamination, for lamination, and as base film for metallization. It furthermore exhibits increased adhesion to cold-sealing adhesives, printing inks and diverse coatings applied after film production.

Foods and other packaged goods are frequently sealed into packaging films. In high-quality packaging, use is made of films which, in order to protect the print and to increase the gloss, are coated with lacquers, such as, for example, PVDC and acrylic lacquers. Depending on the packaging method, it may be necessary here for the inside of the film to be sealed to itself (AA sealing) and to the lacquered outside (AB sealing).

In other areas of food packaging, high seam impermeability, for example in lid films or packaging of dry powders, may, depending on the pack contents, be necessary in order to protect the pack contents against moisture, pest infestation and outside contamination during the [lacuna].

Since the development of heat-sealable films, a reduction in the sealing initiation temperature is a constant requirement of the packaging industry. Low sealing initiation temperatures facilitate higher cycle times for the packager, lower energy costs and protect temperature-sensitive pack contents during the packing process.

British Application GB 2,223,446 "Courtauld" discloses a BOPP film which consists of at least two layers, where the relatively thin layer consists of a blend of a material which has low heat seal strength to PVDC, and a material which consists of a copolymer of an alkene and an unsaturated monobasic acid or an ester thereof. In preferred embodiments, possible materials having low heat seal strength to PVDC are high- and low-density polyethylenes, and possible copolymers are those of ethylene with acrylates, where these copolymers may, in particularly preferred embodiments, comprise unsaturated dibasic acids or anhydrides thereof, such as, for example, maleic anhydride, as further monomers. Corresponding copolymers and terpolymers have been described in EP 0 065 898. However, with the formulations indicated therein, this process results in a high degree of deposits on the heating and stretching rolls of the longitudinal stretching unit of a sequential BOPP machine, which is unacceptable for industrial practice.

German Application 2000/N004 (Application No.: 100 46 543.9) describes a process for the production of a BOPP film comprising the acrylic acid-modified copolymers described in GB 2,223,446 without roll deposits. The film consists of at least two layers, where the outer layer consists of a copolymer or terpolymer and an additive which prevents roll deposits. The copolymer or terpolymer consists of an alkene and an unsaturated monobasic acid or an ester thereof. Preferred copolymers are those of ethylene with acrylates, where these copolymers may, in particularly preferred embodiments, comprise unsaturated dibasic acids or anhydrides thereof, such as, for example, maleic anhydride, as further monomers. Corresponding copolymers and terpolymers have been described in EP 0 065 898. The additives employed are preferably polyethylene waxes, as well as small amounts of polyethylene, such as, for example, HDPE.

The prior art discloses processes for the labelling of containers made from thermoplastic polymers, for example IML and thermolabelling. Labelling by the in-mould labelling (IML process) has been proposed or already developed, for example, for injection moulding, thin-wall injection moulding, blow moulding and thermoforming or injection stretch blow moulding of containers.

Thermolabelling covers all processes in which a label is applied to a separately produced container under the action of heat. For example, the pre-shaped container can be heated in a suitable process and the label pressed onto the container wall using pressure or with the aid of brushes or rolls in such a way that it is subsequently strongly bonded to the container.

Furthermore, processes are known for the labelling of containers after their production or after their filling, such as, for example, wrap-around labelling, patch labelling and self-adhesive labels.

German Application 2000/N005 (Application No.: 100 60 504.4) describes an at least two-layered film which has good adhesion properties to non-polyolefin-based materials. This film has an inner top layer which consists of a copolymer of an alkene and an unsaturated monobasic acid or an ester thereof. Preferred copolymers are those of ethylene with acrylates, where these copolymers may, in particularly preferred embodiments, comprise unsaturated dibasic acids or anhydrides thereof, such as, for example, maleic anhydride, as further monomers. The additives employed are generally polymers of polyolefins without carboxylic acid monomers, polyethylene waxes or polyethylenes, such as HDPE. Whereas conventional BOPP labels cannot be applied to containers made from PET, PS, PC or PVC by in-mould or thermolabelling processes, even at elevated temperatures, a film which adheres to non-polyolefin-based materials is described here for the first time.

Besides the packaging of foods, surface protection of articles of use also plays an important role. A protective film is applied to scratch-sensitive and fragile materials, such as, for example, glass, for transport and later has to be removed again without problems. To this end, a certain adhesion of the film to the material to be protected is necessary in order that the protective film does not detach prematurely. At the same time, however, the adhesion must also not be too great in order that trace-free removal of the protective film is facilitated.

The object of the present invention was to provide a biaxially oriented polyolefin film which has improved heat-sealing and adhesive properties. In particular, it should be possible to employ the film in a particularly varied manner or universally, such as, for example, as low-sealing-temperature packaging film, label or lid film for a very wide variety of substrates, peelable protective film, lamination film, substrate for coatings of all types, metallization, cold-sealing adhesives, printing inks, etc.

In addition, it is necessary that the film can be produced without the formation of deposits on the rolls of the longitudinal stretching unit. In addition, the other important service properties of the film should not be adversely affected.

This object is achieved by a multilayered, biaxially oriented polyolefin film comprising a base layer and at least one first interlayer and a first top layer applied to this interlayer, where this interlayer is built up from a terpolymer I which consists of three different monomers (a), (b) and (c), where (a) is an olefin and (b) is an unsaturated carboxylic acid or an ester thereof and (c) is a carboxylic acid ester which is different from (b) or a carboxylic anhydride, and the top layer comprises a copolymer I which consists of an olefin and an unsaturated carboxylic acid or esters thereof, and the top layer additionally comprises at most 30% by weight of an additive, where the data in % by weight are in each case based on the weight of the top layer. The subclaims indicate preferred embodiments of the invention.

Surprisingly, it has been found that a layer structure comprising the first top layer indicated with the underlying first interlayer has considerable advantages over the known top layers comprising the said copolymers and/or terpolymers. The top layer comprising a copolymer I of olefins and unsaturated carboxylic acids or esters thereof in combination with the interlayer comprising a terpolymer I of (a) olefins, (b) an unsaturated carboxylic acid or an ester thereof, and (c) an unsaturated carboxylic acid or carboxylic acid ester which is different from (b) or a carboxylic anhydride effects an unexpected improvement in the heat-sealing and adhesive properties, in the sense of a synergistic action of the two layers. This layer structure functions like a thermally activatable adhesive layer. At room temperature, the film does not block or stick and can therefore be processed as roll goods without an additional release layer. The films can be wound, printed and cut without problems. Only at temperatures above 70° C. does the film adhere extremely well to the surfaces of various materials and can therefore be used in a very versatile manner.

Films having this combination of a first interlayer and first top layer comprising the said copolymers and terpolymers I exhibit excellent heat-sealing properties to themselves, polyolefin- and non-polyolefin-based materials and excellent adhesion to a very wide variety of polymer materials from which containers are usually shaped. A low-sealing-temperature film having improved heat-sealing and adhesive properties, even to non-polyolefin-based materials, with a universal application spectrum in a breadth which was hitherto not possible can thus be provided. The film can advantageously be used as packaging, protective, label, and lid film, but is also suitable for metallization and lamination. As packaging film, the film exhibits very good seam impermeability and is therefore also suitable for the packaging of dry powders. Furthermore, the film is very highly suitable as substrate for a very wide variety of coatings, for printing inks and cold-sealing adhesives.

The structure and composition of the first top layer in combination with the structure and composition of the underlying first interlayer are essential for these good adhesive properties.

It is essential to the invention that a small amount of an additive is present in the first top layer comprising copolymer I. It has been found that these additives effectively prevent roll deposits during production of the film and at the same time the desired good and diverse adhesive properties of the film are not impaired. In particular, it has been observed that a top layer without additives which is built up only from the copolymer I sticks to the rolls or forms deposits on the rolls during production of the film in such a way that handling of the material in the film production process is virtually impossible.

The first top layer comprises, as constituents which are essential to the invention, a copolymer I comprising an olefin and an unsaturated carboxylic acid or an ester thereof and an additive. If desired, the first top layer additionally comprises antiblocking agents. In general, the first top layer comprises at least 70% by weight, preferably from 90 to 99.5% by weight, in particular from 96 to 99% by weight, of the copolymer I and at most 30% by weight, preferably from 0.5 to 10% by weight, in particular from 1 to 6% by weight, of the additive, in each case based on the weight of the first top layer.

For use as protective film, for example for glass or metal, the proportion of additive in the first top layer can be up to 50% by weight and is preferably in the range from 20 to 40% by weight. The adhesive or heat-sealing properties desired in each case can thus be varied within broad limits and set optimally for the particular application. For example, it is possible to produce films having adhesive strengths of <0.5 N/15 mm which are particularly suitable for use as protective film since the adhesive strength is sufficiently high that the film does not detach in an uncontrolled manner from the surface to be protected.

Suitable copolymers I of the first top layer are built up from olefins and unsaturated carboxylic acids or esters thereof as monomers. Olefins are, for example, ethylene, propylene or 1-butene, optionally also higher homologues, such as, for example, hexene or octene. Preferred unsaturated carboxylic acids are acrylic acid or methacrylic acid and esters thereof. In principle, the copolymer I can be built up from different olefins and different unsaturated carboxylic acids or esters thereof. Copolymers I comprising ethylene and acrylates or methacrylates are particularly advantageous.

The esters of the unsaturated carboxylic acids described in the copolymers I are derived from one or more lower alcohols. For example, methyl, ethyl, n-propyl, i-propyl, n-butyl, i-butyl, sec-butyl or tert-butyl esters are suitable.

The composition of the copolymers I comprising the respective monomers can vary within the limits described below. Copolymers I generally comprise at least 60% by weight, preferably from 70 to 97% by weight, of olefin, preferably ethylene, and at most 40% by weight, preferably from 3 to 30% by weight, of unsaturated carboxylic acids or esters thereof, preferably acrylic acid or methacrylic acid or esters thereof.

The above-described copolymers I of the first top layer generally have a melting point of from 40 to 120° C., preferably from 60 to 100° C. The Vicat point is preferably in the range from 30 to 90° C. The melt flow index is generally from 0.1 to 20 g/10 min (190° C., 21.6 N), preferably from 0.1 to 15 g/10 min.

As further essential component, the first top layer comprises an additive in an amount of from 1 to 30% by weight, up to 50% by weight, based on the weight of the first top layer, in the case of protective film applications. Additives are, for example, waxes, polypropylenes, polyethylenes, polystyrene, polyesters, polyamides or hydrocarbon resins.

The additive employed can be, for example, a wax, preferably polyethylene waxes, or paraffins. Polyethylene waxes are low-molecular-weight polymers which are essentially built up from ethylene units and are partially or highly crystalline. The polymer chains comprising the ethylene units are elongated molecules, which may be branched, with relatively short side chains predominating. The polyethylene waxes preferably have a mean molecular weight Mn (number average) of from 200 to 5000, preferably from 400 to 2000, particularly preferably from 400 to 1000, and preferably have a molecular weight distribution (polydispersity) Mw/Mn of below 3, preferably from 1 to 2. The melting point is generally in the range from 70 to 150° C., preferably from 80 to 100° C.

Paraffins include macrocrystalline paraffins (paraffin waxes) and micro-crystalline paraffins (microwaxes). Macrocrystalline paraffins are obtained from vacuum distillate fractions in the processing of lubricating oils. Microcrystalline paraffins originate from vacuum distillation residues and the sediments of paraffinic crude oils (deposition paraffins). Macrocrystalline paraffins consist predominantly of n-paraffins which additionally comprise isoparaffins, naphthenes and alkylaromatic compounds, depending on the degree of refining. Microcrystalline paraffins consist of a mixture of hydrocarbons which are predominantly solid at room temperature. In contrast to the case in macrocrystalline paraffins, isoparaffins and naphthenic paraffins predominate. Microcrystalline paraffins are distinguished by the presence of crystallization-inhibiting, highly branched isoparaffins and naphthenes. For the purposes of the invention, paraffins having a melting point of from 60 to 100° C., preferably from 60 to 85° C., are particularly suitable.

Further suitable additives are polypropylenes, such as the copolymers and terpolymers II described below, and polyethylenes, where both linear and branched polyethylenes are basically suitable, for example LLDPE, LDPE or HDPE, MDPE, VLDPE, natural or synthetic resins having a softening point of 80–180° C., such as, for example, hydrocarbon resins, ketone resins, colophony, dammar resins, polyamide resins and aliphatic and aromatic hydrocarbon resins, and polymers, such as EMA, EBA and EVA.

If desired, the first top layer may also comprise mixtures of the above-mentioned additives, particular preference being given to mixtures of wax and polyethylene or polypropylene. Combinations of 1–10% by weight of wax and 1–10% by weight of polyethylene or propylene copolymer are particularly advantageous here with respect to deposition during film production without reducing the adhesive properties of the film.

The first top layer may additionally comprise conventional additives, such as neutralisers, stabilisers, antistatics, antiblocking agents and/or lubricants, in effective amounts in each case. The data in % by weight below are in each case based on the weight of the inner top layer. Particular preference is given to embodiments which additionally comprise antiblocking agents in the inner top layer. It has been found that the antiblocking agent contributes towards reducing the deposits (pick-off) during production of the film. Suitable antiblocking agents are inorganic additives, such as silicon dioxide, calcium carbonate, magnesium silicate, aluminium silicate, calcium phosphate and the like, and/or incompatible organic polymers, such as polyamides, polyesters, polycarbonates and the like, or crosslinked polymers, such as crosslinked polymethyl methacrylate, or crosslinked silicone oils. Silicon dioxide and calcium carbonate are preferred. The mean particle size is between 1 and 6 $\mu$m, in particular 2 and 5 $\mu$m. The effective amount of antiblocking agent is in the range from 0.1 to 5% by weight, preferably from 0.5 to 3% by weight, in particular from 0.8 to 2% by weight. In the case of the addition of antiblocking agents (or other additional additives), the proportion of copolymer I in the first top layer is reduced correspondingly.

Lubricants are higher aliphatic acid amides, higher aliphatic acid esters, waxes and metal soaps, as well as polydimethylsiloxanes. The effective amount of lubricant is in the range from 0.01 to 3% by weight, preferably from 0.02 to 1% by weight, based on the top layer. Particularly suitable is the addition of from 0.01 to 0.3% by weight of aliphatic acid amides, such as erucamide, or from 0.02 to 0.5% by weight of polydimethylsiloxanes, in particular polydimethylsiloxanes having a viscosity of from 5000 to 1,000,000 mm$^2$/s.

In a preferred embodiment, the surface of the first top layer is corona-, plasma- or flame-treated. It has been found that a surface treatment of this type, in particular the corona treatment, improves the adhesive strength of the first top layer to the various polymer materials.

The thickness of the first top layer is generally greater than 1 $\mu$m and is no preferably in the range from 1.5 to 5 $\mu$m, in particular from 2 to 3 $\mu$m.

The first interlayer is located between the base layer and the first top layer. The structure and composition of the first interlayer in combination with the structure of the first top layer are essential for the good and versatile heat-sealing and adhesive properties of the film.

The inner interlayer comprises, as constituent which is essential to the invention, a terpolymer I, which is generally built up from three different monomers (a), (b) and (c). The monomers (a) include olefins, such as, for example, ethylene, propylene or 1-butene, if desired also higher homologues, such as, for example, hexene or octene. The monomers (b) are unsaturated carboxylic acids or esters thereof, and monomers (c) are carboxylic acids or carboxylic acid esters which are different from (b) or carboxylic anhydrides. Preferred monomers (c) are unsaturated monocarboxylic acid esters, for example glycidyl methacrylate, or unsaturated dicarboxylic acids or an anhydride thereof, such as, for example, maleic acid or maleic anhydride. Terpolymers comprising (a) ethylene, (b) acrylic acid or methacrylic acid or esters thereof and (c) glycidyl methacrylate or maleic anhydride are particularly advantageous.

The esters of the described unsaturated carboxylic acids of the terpolymers I are derived from one or more lower alcohols. Methyl, ethyl, n-propyl, i-propyl, n-butyl, i-butyl, sec-butyl or tert-butyl esters, for example, are suitable.

The composition of the terpolymers I comprising the respective monomers can vary within the limits described below. Terpolymers I generally comprise (a) from 65 to 96% by weight, preferably from 72 to 93% by weight, of olefin, preferably ethylene, and (b) from 3 to 34% by weight, preferably from 5 to 26% by weight, of unsaturated carboxylic acids or esters thereof, preferably acrylic acid or methacrylic acid or esters thereof, and (c) from 1 to 10% by weight, preferably from 2 to 8% by weight, of unsaturated carboxylic acids or carboxylic acid esters which are different from (b) or carboxylic anhydrides, preferably maleic anhydride or glycidyl methacrylate.

The above-described terpolymers I of the first top layer generally have a melting point of from 40 to 120° C., preferably from 60 to 100° C. The Vicat point (in accordance with DIN 53460) is preferably in the range from 30 to 90° C. The melt flow index is generally from 0.1 to 20 g/10 min (190° C., 21.6 N), preferably from 0.1 to 15 g/10 min.

The first interlayer generally comprises from at least 70 to 100% by weight of the above-described terpolymer 1, preferably from >90 to <100% by weight, based on the weight of the interlayer. The first interlayer may additionally comprise conventional additives, such as neutralisers, stabilisers, antistatics, antiblocking agents and/or lubricants, in effective amounts in each case, as have already been mentioned for the first top layer. If desired, it is also possible to incorporate up to 30% by weight, preferably <10% by weight, of additives which have already been described for the top layer into the interlayer. Waxes, polyethylenes and propylene copolymers, if present, are also preferred for the interlayer. In the case of incorporation of these additives or addition of conventional additives, the proportion of terpolymer I in the first interlayer is reduced correspondingly.

The first interlayer generally has a thickness of from at least 1 to 15 $\mu$m, preferably from 2 to 10 $\mu$m.

In accordance with the invention, films which [lacuna] with the above-described combination of first top layer and first interlayer have particularly versatile and outstanding adhesive properties, enabling the film according to the invention to be employed for a multiplicity of applications. It has been found that the adhesive properties as compared to conventional biaxially oriented polypropylene films are significantly improved.

In addition, it has been found that the combination of first interlayer and first top layer cooperates synergistically with respect to the heat seal strength. The heat seal strength of the first top layer in an analogous film structure without the first interlayer described is a maximum of 0.5 N/15 mm at temperatures of up to 120° C. (sealing pressure 10 N/cm2; pressure time 0.5 s). If the first top layer is omitted and the surface of the first interlayer is sealed to itself under the same conditions, heat seal strengths of 1.5 N/15 mm are hardly exceeded at all, even at elevated temperatures of 125° C. For the film according to the invention with a first interlayer and top layer lying one on top of the other, heat seal strengths (under identical sealing conditions) of at least 2.0 N/15 mm were reliably achieved from sealing temperatures of 100° C. At higher sealing temperatures of from 120 to 125° C., the heat seal strengths increased to values of up to 2.7 N/15 mm.

On use of the film as label in the IML process or by the thermolabelling process, the film, without further application of additional adhesive layers, exhibits very good adhesive strength on warming to >70° C. not only to PP and PE containers, but also to PVC, PS and PET containers or other materials. The film can therefore be applied very well to any desired vessels by means of these conventional labelling processes.

The good adhesive properties furthermore enable use as lid film for any desired containers made from materials such as PP, PE, PVC, PS or PET. It has been found that the film reliably forms an impermeable seam and nevertheless can be peeled off without leaving a residue on opening.

Embodiments having a high proportion of additive of greater than 15% by weight, preferably 20% by weight, in the first top layer can be used very well as peelable protective film, for example on wood, glass, scratch-sensitive plastic and metal surfaces. The film is applied at elevated temperature to the surface to be protected and initially adhered very well and protects the respective surface against scratches or other damage during transport or storage. It can subsequently be peeled off again in one piece without leaving a residue, even after an extended period, without adhesive residues remaining on the surface of the article of use.

The surface of the layer structure according to the invention comprising first interlayer and first top layer is, in addition, eminently suitable for application of printing inks, coatings and cold-sealing adhesives as well as for metallization. Surprisingly, it is not necessary here to apply a primer or other adhesion promoter in order to achieve good adhesive strength.

In a further application, the film can be employed for lamination at elevated temperatures. These processes are carried out at a temperature of >70° C. The substrates employed can again be a very wide variety of materials, of which paper, wood, other thermoplastic films, metal, for example aluminium or tinplate, are preferred. Here too, an additional adhesive or adhesion promoter, as otherwise usual, is not required.

The film according to the invention can be employed as low-sealing-temperature packaging film on horizontal or vertical packaging machines. In addition, the film seals to lacquers, such as PVDC and acrylic lacquers, where high heat seal strengths and impermeabilities are achieved. Of the various packaging applications, packaging for dry powders is also possible. It has been found here that the heat-sealing of the first top layer is still reliably possible even in the case of contamination of the heat-sealing region by the pulverulent pack contents. High seam impermeability of the heat-sealing seam ensures that the powder does not cake or spoil due to penetrating moisture.

The above-described combination of first interlayer and first top layer can advantageously be applied to transparent or opaque base layers. For the purposes of the present invention, "opaque film" or "opaque layer" means a non-transparent film whose light transparency (ASTM-D 1003-77) is at most 70%, preferably at most 50%.

For transparent embodiments, the base layer of the film generally comprises at least 85–100% by weight, preferably from 90 to <100% by weight, in particular from 95 to 99% by weight, in each case based on the base layer, of a polyolefin. Polyolefins are, for example, polyethylenes, polypropylenes, polybutylenes or copolymers of olefins having from two to eight carbon atoms, amongst which polyethylenes and polypropylenes are preferred.

In general, the propylene polymer comprises at least 90% by weight, preferably from 94 to 100% by weight, in particular from 98 to <100% by weight, of propylene. The corresponding comonomer content of at most 10% by weight or from 0 to 6% by weight or from 0 to 2% by weight respectively generally consists, if present, of ethylene. The data in % by weight are in each case based on the propylene polymer.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 1 to 10% by weight, preferably from 2 to 5% by weight, based on the starting polymer. The molecular weight distribution of the propylene polymer can vary. The ratio between the weight average molecular weight $M_w$ and the number average molecular weight $M_n$ is generally between 1 and 15, preferably from 2 to 10, very particularly preferably from 2 to 6. Such a narrow molecular weight distribution of the propylene homopolymer of the base layer is achieved, for example, by peroxidic degradation thereof or by preparation of the polypropylene by means of suitable metallocene catalysts.

In a preferred embodiment, the base layer is opaque through the addition of fillers. In general, the base layer in this embodiment comprises at least 70% by weight, preferably from 75 to 99% by weight, in particular from 80 to 98% by weight, in each case based on the weight of the base layer, of the above-described polyolefins or propylene polymers, where the propylene homopolymers described are likewise preferred.

The opaque base layer comprises fillers in a maximum amount of 30% by weight, preferably from 1 to 25% by weight, in particular from 2 to 20% by weight, based on the weight of the base layer. For the purposes of the present invention, fillers are pigments and/or vacuole-initiating particles.

For the purposes of the present invention, pigments are incompatible particles which essentially do not result in vacuole formation when the film is stretched. The colouring action of the pigments is caused by the particles themselves.

"Pigments" generally have a mean particle diameter of from 0.01 to a maximum of 1 µm, preferably from 0.01 to 0.7 µm, in particular from 0.01 to 0.4 µm. Pigments include both so-called "white pigments", which colour the films white, and "coloured pigments", which give the film a coloured or black colour. Conventional pigments are materials such as, for example, aluminium oxide, aluminium sulphate, barium sulphate, calcium carbonate, magnesium carbonate, silicates, such as aluminium silicate (kaolin clay) and magnesium silicate (talc), silicon dioxide and titanium dioxide, of which preference is given to the use of white pigments, such as calcium carbonate, silicon dioxide, titanium dioxide and barium sulphate.

The titanium dioxide particles generally consist of at least 95% by weight of rutile and are preferably employed with a coating of inorganic oxides and/or of organic compounds containing polar and nonpolar groups. TiO2 coatings of this type are known from the prior art.

For the purposes of the present invention, "vacuole-initiating fillers" are solid particles which are incompatible with the polymer matrix and result in the formation of vacuole-like cavities when the films are stretched, with the size, nature and number of the vacuoles being dependent on the size and amount of the solid particles and the stretching conditions, such as stretching ratio and stretching temperature. The vacuoles reduce the density and give the films a characteristic pearl-like opaque appearance caused by light scattering at the "vacuole/polymer matrix" interfaces. Light scattering at the solid particles themselves generally contributes relatively little to the opacity of the film. In general, the vacuole-initiating fillers have a minimum size of 1 µm in order to give an effective, i.e. opacifying, amount of vacuoles. In general, the mean particle diameter of the particles is from 1 to 6 µm, preferably from 1.5 to 5 µm. The chemical character of the particles plays a secondary role.

Conventional vacuole-initiating fillers are inorganic and/or organic, polypropylene-incompatible materials, such as aluminium oxide, aluminium sulphate, barium sulphate, calcium carbonate, magnesium carbonate, silicates, such as aluminium silicate (kaolin clay) and magnesium silicate (talc), and silicon dioxide, amongst which calcium carbonate and silicon dioxide are preferably employed. Suitable organic fillers are the conventional polymers which are incompatible with the polymer of the base layer, in particular those such as HDPE, copolymers of cyclic olefins, such as norbornene or tetracyclododecene with ethylene or propene, polyesters, polystyrenes, polyamides and halogenated organic polymers, preference being given to polyesters, such as, for example, polybutylene terephthalates. For the purposes of the present invention, "incompatible materials or incompatible polymers" means that the material or polymer is in the film in the form of a separate particle or separate phase.

The opaque base layer preferably comprises pigments in an amount of from 0.5 to 10% by weight, preferably from 1 to 8% by weight, in particular from 1 to 5% by weight. Vacuole-initiating fillers are generally present in an amount of from 0.5 to 30% by weight, preferably from 1 to 15% by weight, in particular from 1 to 10% by weight. The data are based on the weight of the base layer.

The density of the film can vary, depending on the composition of the base layer, in a range from 0.4 to 1.1 g/cm$^3$. Vacuoles contribute to a reduction in the density, whereas TiO$_2$ increases the density of the film owing to its relatively high specific weight. The density of the film is preferably from 0.5 to 0.95 g/cm$^3$.

In addition, the base layer can, both in a transparent and in an opaque embodiment, comprise conventional additives, such as neutralisers, stabilisers, antistatics and/or lubricants, in effective amounts in each case.

The following data in % by weight are in each case based on the weight of the base layer.

Preferred antistatics are alkali metal alkanesulphonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having from 10 to 20 carbon atoms which are substituted by co-hydroxy-($C_1$–$C_4$)alkyl groups, where N,N-bis(2-hydroxyethyl)alkylamines having from 10 to 20 carbon atoms, preferably from 12 to 18 carbon atoms, in the alkyl radical are particularly suitable. The effective amount of antistatic is in the range from 0.05 to 0.5% by weight.

Lubricants are higher aliphatic acid amides, higher aliphatic acid esters, waxes and metal soaps, as well as polydimethylsiloxanes. The effective amount of lubricant is in the range from 0.01 to 3% by weight, preferably from 0.02 to 1% by weight. Particularly suitable is the addition of higher aliphatic acid amides in the range from 0.01 to 0.25% by weight to the base layer. Particularly suitable aliphatic acid amides are erucamide and stearylamide. The addition of polydimethylsiloxanes is preferred in the range from 0.02 to 2.0% by weight, in particular polydimethylsiloxanes having a viscosity of from 5000 to 1,000,000 mm$^2$/s.

Stabilisers which can be employed are the conventional stabilising compounds for polymers of ethylene, propylene and other α-olefins. They are added in an amount of between 0.05 and 2% by weight. Particularly suitable are phenolic and phosphitic stabilisers. Phenolic stabilisers having a molecular weight of greater than 500 g/mol are preferred, in particular pentaerythrityl tetrakis-3-(3,5-di-tertiary-butyl-4-hydroxyphenyl)propionate or 1,3,5-trimethyl-2,4,6-tris(3,5-di-tertiary-butyl-4-hydroxybenzyl)benzene.

Phenolic stabilisers are employed here alone in an amount of from 0.1 to 0.6% by weight, in particular from 0.1 to 0.3% by weight, phenolic and phosphitic stabilisers in the ratio from 1:4 to 2:1 and in a total amount of from 0.1 to 0.4% by weight, in particular from 0.1 to 0.25% by weight.

Neutralisers are preferably dihydrotalcite, calcium stearate and/or calcium carbonate having a mean particle size of at most 0.7 µm, an absolute particle size of less than 10 µm and a specific surface area of at least 40 m$^2$/g. Amount: 0.02–0.1%.

For three-layered embodiments of the film according to the invention, which consist only of the base layer, the first interlayer and the first top layer, it is preferred that the outer surface of the base layer is surface-treated by means of a corona, flame or plasma.

The polyolefin film according to the invention preferably has a second top layer which exhibits good adhesion to conventional printing inks, adhesives, and coatings and/or lacquers. This second top layer of the film is preferably applied to the opposite surface of the base layer and is referred to below as "second top layer". In order further to improve the adhesion of printing inks, adhesives and coatings, it is preferred to carry out a corona, plasma or flame treatment of the surface of the second top layer.

The second top layer is generally built up from polymers of olefins having from 2 to 10 carbon atoms. The second top layer generally comprises from 95 to 100% by weight of polyolefin, preferably from 98 to <100% by weight of polyolefin, in each case based on the weight of the top layer(s).

Examples of suitable olefinic polymers of the second top layer(s) are propylene homopolymers, copolymers or terpolymers II comprising ethylene propylene and/or butylene units or mixtures of the said polymers. These copolymers or terpolymers II contain no carboxylic acid monomers (or esters thereof. They are polyolefins. Of these, preferred polymers are random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, or random ethylene-propylene-1-butylene terpolymers having an ethylene content of from 1 to 10% by weight and a 1-butylene content of from 2 to 20% by weight, or a mixture or blend of ethylene-propylene-1-butylene terpolymers and propylene-1-butylene copolymers having an ethylene content of from 0.1 to 7% by weight and a propylene content of from 50 to 90% by weight and a 1-butylene content of from 10 to 40% by weight. The data in % by weight are in each case based on the weight of the polymer.

The above-described copolymers and/or terpolymers 11 employed in the second top layer generally have a melt flow index of from 1.5 to 30 g/10 min, preferably from 3 to 15 g/10 min. The melting point is in the range from 120 to 140° C. The above-described blend of copolymers and terpolymers II has a melt flow index of from 5 to 9 g/10 min and a melting point of from 120 to 150° C. All the melt flow indices indicated above are measured at 230° C. and a force of 21.6 N (DIN 53 735). If desired, all the top-layer polymers described above can have been peroxidically or alternatively thermooxidatively degraded, with the degradation factor generally being in a range from 1 to 15, preferably from 1 to 8.

If desired, the above-described additives, such as antistatics, neutralisers, lubricants and/or stabilisers, and, if desired, additionally antiblocking agents can be added to the second top layer. The data in % by weight are then based correspondingly on the weight of the top layer.

Suitable antiblocking agents have already been described in connection with the first top layer. These antiblocking agents are also suitable for the second top layer. The preferred amount of antiblocking agent for the second top layer is in the range from 0.1 to 2% by weight, preferably from 0.1 to 0.8% by weight.

The thickness of the second top layer is generally greater than 0.1 $\mu$m and is preferably in the range from 0.1 to 5 $\mu$m, in particular from 0.3 to 2 $\mu$m.

In a particularly preferred embodiment, the surface of the second top layer is corona-, plasma- or flame-treated. This treatment serves to prepare the film surface for subsequent decoration and printing, i.e. to ensure wettability with and adhesion of printing inks and other decoration agents.

The film according to the invention comprises at least the base layer described above, the first top layer and the first interlayer, comprising copolymer or terpolymer I and additive and, if desired, additionally the second top layer described. In a further advantageous embodiment, a second interlayer is applied to the opposite surface of the base layer, resulting in 5-layered films.

This second interlayer(s) can be built up from the olefinic polymers, preferably propylene polymers, described for the base layer or for the second top layers. The second interlayer can comprise the conventional additives described for the individual layers, such as antistatics, neutralisers, lubricants and/or stabilisers, and optionally $TiO_2$ for improving opacity and whiteness in the case of opaque embodiments. The thickness of this second interlayer is greater than 0.5 $\mu$m and is preferably in the range from 0.6 to 4 $\mu$m, in particular from 0.8 to 3 $\mu$m.

The second interlayer which can be applied between the second top layer and the base layer (second interlayer below) may comprise migrating additives and, in a particular embodiment, contributes to high gloss of the film, in particular, unfilled outer interlayers comprising propylene homopolymer. For embodiments in which a white or opaque appearance of the label is desired, the outer interlayer comprises vacuole-initiating fillers and/or pigments, in particular $CaCO_3$ and $TiO_2$, which ensure particularly high hiding power. The thickness of this outer interlayer is greater than 0.3 $\mu$m and is preferably in the range from 1.0 to 15 $\mu$m, in particular from 1.5 to 10 $\mu$m.

The total thickness of the three-, four- or five-layered film according to the invention can vary within broad limits and depends on the intended use. It is preferably from 15 to 150 $\mu$m, in particular from 20 to 100 $\mu$m, preferably from 25 to 90 $\mu$m. The base layer makes up from about 40 to 99% of the total film thickness.

The invention furthermore relates to a process for the production of the polyolefin film according to the invention by the coextrusion process, which is known per se. This process is carried out by coextruding the melts corresponding to the individual layers of the film through a flat-film die, taking off the resultant film over one or more roll(s) for solidification, subsequently stretching (orienting) the film, heat-setting the stretched film and, if desired, plasma-corona- or flame-treating the surface layer intended for the treatment.

Biaxial stretching (orientation) is carried out sequentially or simultaneously.

The sequential stretching is generally carried out consecutively, with consecutive biaxial stretching, in which stretching is firstly carried out longitudinally (in the machine direction) and then transversely (perpendicular to the machine direction), being preferred. The film production is described further using the example of flat-film extrusion with subsequent sequential stretching.

Firstly, as is usual in the extrusion process, the polymer or polymer mixture of the individual layers is compressed and liquefied in an extruder, it being possible for any additives added already to be present in the polymer or polymer mixture. The melts are then forced simultaneously through a flat-film die (slot die), and the extruded multilayered film is taken off over one or more take-off rolls at a temperature of from 10 to 100° C., preferably from 10 S to 50° C., during which it cools and solidifies.

The film obtained in this way is then stretched longitudinally and transversely to the extrusion direction, which results in alignment of the molecule chains. The longitudinal stretching is preferably carried out at a temperature of from 70 to 130° C., preferably from 80 to 110° C., advantageously with the aid of two rolls running at different speeds corresponding to the target stretching ratio, and the transverse stretching is preferably carried out at a temperature of from 120 to 180° C. with the aid of an appropriate tenter frame. The longitudinal stretching ratios are in the range from 3 to 8, preferably from 4 to 6. The transverse stretching ratios are in the range from 5 to 10, preferably from 7 to 9.

In principle, it is necessary for the longitudinal stretching of a film by means of rolls to warm the film to a minimum temperature through the roll contact in order that uniform stretching is possible. In connection with the present invention, it has been found that the top layers comprising copolymer I has an increased tendency to stick to the rolls of the longitudinal stretching unit. It has been found that a film whose top layer consists only of copolymer I cannot be stretched in the longitudinal direction by means of rolls using the conventional stenter process. If the temperatures are too high, deposits on the longitudinal stretching rolls result in optical defects. At lower temperatures, stretch arcs and tears occur. Without additives, it has not been possible to find a suitable temperature range in which the film can be produced on a production scale.

Surprisingly, the described additives in the top layer significantly reduce the tendency of the top-layer raw material to stick and deposits on the longitudinal stretching rolls. It has thus been possible to find a temperature range which allows the production of the film on a production scale. It has been found that the addition of the waxes, polyethylenes or other additives facilitates longitudinal stretching at a temperature in the region of the melting point of the particular top-layer raw material. Preference is given to a temperature in the region of 10° C., preferably 5° C., above or below the melting point of the copolymer I.

The stretching of the film is followed by heat-setting (heat treatment) thereof, in which the film is held at a temperature of from 100 to 160° C. for from about 0.1 to 10 seconds. The film is subsequently wound up in a conventional manner by means of a wind-up device.

After the biaxial stretching, one or both surface(s) of the film is (are) preferably plasma-, corona- or flame-treated by one of the known methods. The treatment intensity is generally in the range from 35 to 50 mN/m, preferably from 37 to 45 mN/m.

In the case of corona treatment, an advantageous procedure is to pass the film between two conductor elements serving as electrodes, with such a high voltage, usually an alternating voltage (from about 5 to 20 kV and from 5 to 30 kHz), being applied between the electrodes that spray or corona discharges are able to occur. Due to the spray or corona discharge, the air above the film surface is ionised and reacts with the molecules of the film surface, causing the formation of polar inclusions in the essentially non-polar polymer matrix.

The surface treatment, such as, for example, corona treatment, can be carried out immediately during production of the film or at a later point in time, for example immediately before processing.

The film can be employed for the labelling of containers by the thermolabelling method. For the purposes of the present invention, thermolabelling is a labelling method in which the label is applied under the action of heat (without additional assistants) to a container which has been produced in advance, i.e. in a separate working step. A surprisingly large number of container materials can be labelled with the [lacuna], for example glass, tinplate or aluminium, or thermoplastic polymers.

It is not necessary for the film additionally to be provided with coupling agents and assistants, adhesives or coatings on the inside. All that is needed is the action of heat and, if necessary, additionally pressure in order to apply the film with its inner, i.e. first top layer to the surface of the container wall. Either the film or the pre-shaped container can be heated to a suitable temperature range in a subsequent process step (i.e. after production of the container), where the container should remain as dimensionally stable as possible at these temperatures. The additional use of a suitable contact pressure together with the action of heat may be helpful. The contact pressure can vary within broad limits and is dependent on the method and the container shape (is in general >10 N/cm$^2$).

If desired, the film as label may also only be bonded to the container wall on a part area (patch labelling). In this variant, an adhesive is applied to the label in accordance with the prior art, and the label is subsequently applied to the container wall. In the case of the film according to the invention, the application of adhesive is superfluous. One or more labels made from the film according to the invention can be applied to a container in this way.

A further variant of container post-labelling is wrap-around labelling, in which the label in the form of a strip is wrapped around the container and, in accordance with the prior art, only bonded to the container wall or to itself at the ends of the strip. This is carried out by application of a hot-melt adhesive, which ensures adhesion of the label to the container or of the label to itself. In the case of the film according to the invention, the application of adhesive is superfluous.

Depending on the method variant selected, it may be advantageous also or only to heat the label film before application. In these cases, the preferred temperature range of the inner film surface is from 70 to 130° C., particularly preferably from 80 to 125° C. Surprisingly, only very low temperatures are necessary in order to produce good adhesion of the label by means of thermolabelling.

Depending on the printing method used, the process for the production of the containers and the machinery at the site of label application, the labels can be delivered by the "cut-in-place" method or by the "cut & stack" method.

In a further application, the film according to the invention may also be employed as a constituent of a laminate, which can itself be used in the manner described as in-mould or thermolabelling label. The films according to the invention then forms the inside of the laminate, so that, in accordance with the invention, the surface of the first top layer faces the container and ensures good adhesion to the container. More or less thin, transparent films, in particular transparent BOPP films, are typically used on the opposite outside of the label. The print motif here is located between the inner and outer films. The two films are bonded to one another by means of a suitable adhesive.

In the case of application as packaging film, particularly in the case of fragile pack contents, such as biscuits, heat-sealing must be carried out at only low sealing pressures. A film is therefore required here which ensures adequate heat seal strength and impermeability even at the lowest possible sealing pressures and temperatures in order to protect the pack contents against pest infestation and other interfering outside influences. In addition, the outside of high-quality film is often coated with a lacquer, such as PVDC and acrylic lacquer, so that a film is required here which seals to itself and to these lacquers. An application form of this type is, for example, the roll-wrap process, for which the film according to the invention is likewise highly suitable.

Measurement Methods

The raw materials and films were characterized using the following measurement methods:

Melt Flow Index

The melt flow index was measured in accordance with DIN 53 735 at a load of 21.6 N and 230° C.

Melting Point

DSC measurement, maximum of the melting curve, heating rate 20° C./min.

Haze

The haze of the film was measured in accordance with ASTM-D 1003-52.

Gloss

The gloss was determined in accordance with DIN 67 530. The reflector value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Surface Tension

The surface tension was determined by the so-called ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as moderate, and if a significant amount of ink was removed, it was assessed as poor.

The invention is now explained with reference to working examples.

EXAMPLE 1

An opaque, white, four-layered film consisting of the base layer C, an inner, first top layer A, an inner, first interlayer B and an outer, second top layer E having a total thickness of 60 µm was produced by coextrusion and subsequent stepwise orientation in the longitudinal and transverse directions. The first top layer A had a thickness of 2.0 µm and the second top layer E had a thickness of 0.7 µm, and the first interlayer B had a thickness of 2 µm. The layers had the following compositions:

Base Layer C:
91.74% by weight of propylene homopolymer having a melting point of 165° C. and a melt flow index of 3.4 g/10 min and a chain isotacticity index of 94%
5.1% by weight of calcium carbonate
2.8% by weight of titanium dioxide (rutile)
0.10% by weight of erucamide (lubricant)
0.10% by weight of Armostat 300 (antistatic)
0.03% by weight of neutraliser (CaCO3)
0.13% by weight of stabiliser (Irganox)

Top Layer A:
89.5% by weight of copolymer of ethylene and methacrylate having an ethylene content of 77% by weight and a methacrylate content of 23% by weight, based on the copolymer. The melt flow index was 8.0 g/10 min [at 190° C., 21.6 N].
0.5% by weight of SiO2 as antiblocking agent having a mean particle size of 4 µm
10.0% by weight of polyethylene wax having a molecular weight Mn (number average) of 2000

Interlayer B:
90.0% by weight of terpolymer of ethylene, ethyl acrylate and maleic anhydride having an ethylene content of 91% by weight, an ethyl acrylate content of 5% by weight and a maleic anhydride content of 4% by weight, based on the terpolymer. The melt flow index was 5.0 g/10 min [at 190° C., 21.6 N].
10.0% by weight of polyethylene wax having a molecular weight Mn (number average) of 2000

Top Layer E:
99.54% by weight of random copolymer of ethylene and propylene having a melt flow index of 6.0 g/10 min and an ethylene content of 6% by weight, based on the copolymer
0.22% by weight of SiO2 as antiblocking agent having a mean particle size of 4 µm 0.20% by weight of stabiliser (Irganox 1010/Irgafos 168)
0.04% by weight of neutraliser (Ca stearate)

The production conditions in the individual process steps were as follows:

| Extrusion: | temperatures base layer C: | 260° C. |
| --- | --- | --- |
| | interlayer B: | 235° C. |
| | top layer A: | 230° C. |
| | top layer C: | 240° C. |
| | temperature of the take-off roll: | 20° C. |
| Longitudinal stretching: | temperature: | 100° C. |
| | longitudinal stretching ratio: | 1:4.5 |
| Transverse stretching: | temperature: | 165° C. |
| | transverse stretching ratio: | 1:9 |
| Setting: | temperature: | 140° C. |
| | convergence: | 10% |
| Pressure pretreatment | top layer A | corona 10,000 V/10,000 Hz |
| | top layer C | corona 10,000 V/10,000 Hz |

The transverse stretching ratio of 1:9 is an effective value. This effective value is calculated from the final film width B, reduced by twice the hem width b, divided by the width of the longitudinally stretched film C, likewise reduced by twice the hem width b.

The film was employed as label film for thermolabelling. In this process, a commercially available glass bottle was pre-heated to 60° C., and the label was applied to the container at 110° C. by means of a hand heat-sealing piston.

In a further application, the film was employed as packaging film and heat-sealed at 110° C. and 10 N/cm2 and 0.5 sec. A heat seal strength of 2.5 N/15 mm was achieved.

EXAMPLE 2

A four-layered, white, opaque film as described in Example 1 was produced. In contrast to Example 1, the composition of the top layer A and the interlayer B were changed as follows. The other layers and the production conditions in the individual process steps were as in Example 1.

Top Layer A:
90.0% by weight of copolymer of ethylene and methacrylate having an ethylene content of 77% by weight and a methacrylate content of 23% by weight, based on the copolymer. The melt flow index was 8.0 g/10 min [at 190° C., 21.6 N].
10.0% by weight of HDPE having an MFI of 15 g/10 min (190° C./2.16 kg) and a melting point of 133° C. (DSC @ 10° C./min)

Interlayer B:
100.0% by weight of terpolymer of ethylene, ethyl acrylate and maleic anhydride having an ethylene content of 91% by weight ethyl acrylate content of 5% by weight and a maleic anhydride content of 4% by weight, based on the terpolymer. The melt flow index was 5.0 g/10 min [at 190° C., 21.6 N].

The film was metallized and subsequently employed as packaging film.

EXAMPLE 3

A white, opaque film was produced as described in Example 1. In contrast to Example 1, 10% by weight of HDPE was additionally incorporated into the top layer A and into the interlayer B, and the content of copolymer was reduced correspondingly. In addition, a gloss interlayer D having a thickness of 4 µm made from pure homoPP was applied. The production conditions in the individual process steps were as in Example 1.

Top Layer A:
79.5% by weight of copolymer of ethylene and methacrylate having an ethylene content of 77% by weight and a methacrylate content of 23% by weight, based on the copolymer. The melt flow index was 8.0 g/10 min [at 190° C., 21.6 N].
0.5% by weight of SiO2 as antiblocking agent having a mean particle size of 4 μm
10.0% by weight of polyethylene wax having a molecular weight Mn (number average) of 2000
10.0% by weight of HDPE having an MFI of 15 g/10 min (190° C./2.16 kg) and a melting point of 133° C. (DSC @ 10° C./min)
Interlayer B:
80.0% by weight of terpolymer of ethylene, ethyl acrylate and maleic anhydride having an ethylene content of 91% by weight, an ethyl acrylate content of 5% by weight and a maleic anhydride content of 4% by weight, based on the terpolymer. The melt flow index was 5.0 g/10 min [at 190° C., 21.6 N].
10.0% by weight of polyethylene wax having a molecular weight Mn (number average) of 2000
10.0% by weight of HDPE having an MFI of 15 g/10 min (190° C./2.16 kg) and a melting point of 133° C. (DSC @ 10° C./min)

The film was employed as label film for in-mould labelling with polystyrene (injection temperature: about 170° C.), with adhesive strengths of >1.0 N/15 mm being achieved.

EXAMPLE 4

A film was produced as described in Example 3. In contrast to Example 3, the addition of calcium carbonate and titanium dioxide to the base layer was omitted. The polypropylene content was increased correspondingly. A transparent five-layered film was thereby obtained. The production conditions in the individual process steps were as in Example 3. In addition, the composition of the top layer A and the interlayer B was changed as follows:
Top Layer A:
89.5% by weight of copolymer of ethylene and methacrylate having an ethylene content of 77% by weight and a methacrylate content of 23% by weight, based on the copolymer. The melt flow index was 8.0 g/10 min [at 190° C., 21.6 N].
0.5% by weight of SiO2 as antiblocking agent having a mean particle size of 4 μm
5.0% by weight of polyethylene wax having a molecular weight Mn (number average) of 2000
5.0% by weight of HDPE having an MFI of 15 g/10 min (190° C./2.16 kg) and a melting point of 133° C. (DSC @ 10° C./min)
Interlayer B:
90.0% by weight of terpolymer of ethylene, ethyl acrylate and maleic anhydride having an ethylene content of 91% by weight, an ethyl acrylate content of 5% by weight and a maleic anhydride content of 4% by weight, based on the terpolymer. The melt flow index was 5.0 g/10 min [at 190° C., 21.6 N].
5.0% by weight of polyethylene wax having a molecular weight Mn (number average) of 2000
5.0% by weight of HDPE having an MFI of 15 g/10 min (190° C./2.16 kg) and a melting point of 133° C. (DSC@ 10° C./min).

The film was employed for paper lamination, as used, for example, for the protection of documents. In this process, the transparent film according to the invention was laminated onto paper at 110° C. with the aid of conventional contact rolls without the additional use of an adhesive. The adhesive strength here was so high that the paper tore during the attempt to separate film and paper.

EXAMPLE 5

A white, opaque, five-layered film was produced as described in Example 3. The production conditions in the individual process steps were as in Example 3. In addition, the composition of the top layer A and the interlayer B was changed as follows:
Top Layer A:
49.5% by weight of copolymer of ethylene and methacrylate having an ethylene content of 77% by weight and a methacrylate content of 23% by weight, based on the copolymer. The melt flow index was 8.0 g/10 min [at 190° C., 21.6 N].
0.5% by weight of SiO2 as antiblocking agent having a mean particle size of 4 μm
50.0% by weight of random copolymer of ethylene and propylene having a melt flow index of 6.0 g/10 min and an ethylene content of 6% by weight, based on the copolymer
Interlayer B:
50.0% by weight of terpolymer of ethylene, ethyl acrylate and maleic anhydride having an ethylene content of 91% by weight, an ethyl acrylate content of 5% by weight and a maleic anhydride content of 4% by weight, based on the terpolymer. The melt flow index was 5.0 g/10 min [at 190° C., 21.6 N].
50.0% by weight of random copolymer of ethylene and propylene having a melt flow index of 6.0 g/10 min and an ethylene content of 6% by weight, based on the copolymer Owing to the high copolymer content, which reduces the adhesive strength of the film, the film was employed as protective film for glass. In this process, the film was attached to a glass sheet at 130° C. using a hand heat-sealing piston. The film could be peeled off again without problems without tearing or partly remaining adhering to the glass surface. The adhesive strength was 0.4 N/15 mm.

COMPARATIVE EXAMPLE 1

A white, opaque, three-layered film was produced as described in Example 1 by, in contrast to Example 1, omitting the interlayer B. The production conditions in the individual process steps were as in Example 1.

The film was employed as label film for thermolabelling. In this process, a commercially available glass bottle was pre-heated to 60° C. and it was attempted to apply the label to the container at 110° C. by means of a hand heat-sealing piston. In spite of intensive efforts and increasing the temperature to 130° C. in steps, it was not possible to achieve any adhesion of the label to the glass container at all.

COMPARATIVE EXAMPLE 2

A white, opaque, three-layered film was produced as described in Example 1 by, in contrast to Example 1, omitting the top layer A. The production conditions in the individual process steps were as in Example 1.

The film was employed as packaging film and was heat-sealed at 110° C. and 10 N/cm2 and 0.5 sec. Only a heat seal strength of 1.3 N/15 mm was achieved.

COMPARATIVE EXAMPLE 3

A white, opaque film was produced as described in Example 1. In contrast to Example 1, any admixing of additives was omitted. The production conditions in the individual process steps were as in Example 1. Owing to considerable roll deposits in the longitudinal stretching, it was not possible to produce a film.

What is claimed is:

1. Multilayered, biaxially oriented polyolefin film comprising a base layer and at least one first interlayer and a first top layer applied to this interlayer, characterized in that this first interlayer is built up from a terpolymer which consists of three different monomers (a), (b) and (c), where (a) is an olefin and (b) is an unsaturated carboxylic acid or an ester thereof and (c) is an unsaturated carboxylic acid or carboxylic acid ester which is different from (b) or a carboxylic anhydride, and the first top layer comprises a copolymer which consists of an olefin and an unsaturated carboxylic acid or an ester thereof; and this first top layer additionally comprises an additive.

2. Film according to claim 1, characterized in that the additive is present in the top layer in an amount of up to 30% by weight, and the copolymer is present in the top layer in an amount of at least 70% by weight; based on the weight of the top layer.

3. Film according to claim 1, characterized in that the additive is polyethylene, hydrocarbon resin, EBA, EVA, EMA, propylene homopolymer, copolymers or terpolymers comprising ethylene, propylene and/or butylene units and/or wax.

4. Film according to claim 3, characterized in that the copolymer or terpolymer comprises from 75 to 92% by weight of propylene units.

5. Film according to claim 3, characterized in that the wax has a mean molecular weight Mn (number average) Mn of from 200 to 5000, and the wax has a melting point of from 70 to 150° C.

6. Film according to claim 3, characterized in that the polyethylene is a linear or branched polyethylene.

7. Film according to claim 3, characterized in that the copolymer or terpolymer comprises at least 50% by weight, of propylene units.

8. Film according to claim 7, characterized in that the copolymer has a melting point of 40–120° C. and a melt flow index of 0.1–20 g/10 mm (at 90° C. and 21.6 N).

9. Film according to claim 1, characterized in that the copolymer is built up from ethylene, propylene or butene, hexene or octene units and acrylic acid, methacrylic acid, aciylate or methacrylate units.

10. Film according to claim 9 characterized in that the copolymer consists of at least 60–97% by weight of ethylene units and at most 3–40% by weight of acrylate or methacrylate units.

11. Film according to claim 1, characterized in that the first top layer additionally comprises an inorganic or organic antiblocking agent.

12. Film according to claim 11, wherein said antiblocking agent is $SiO_2$, $CaCO_3^-$, polycarbonate, polyamides, polyesters, crosslinked silicone oil or polymethyl methacrylate and the first top layer comprises from 1 to 4% by weight of antiblocking agent.

13. Film according to claim 11, characterized in that the first top layer comprises from 0.1 to 5% by weight, of antiblocking agent.

14. Film according to claim 11, characterized in that the anti-blocking agent has a mean particle size of from 1 to 6 μm.

15. Film according to claim 1, wherein the first top layer has a thickness of from 1 to 5 μm.

16. Film according to claim 1, characterized in that the surface of the first top layer has been surface-treated by means of a corona, flame or plasma.

17. Film according to claim 1, characterized in that the monomers (a), (b) and (c) are selected from the groups
(a) ethylene, propylene, butene, hexene or octene
(b) acrylic acid, methacrylic acid, acrylate or methacrylate
(c) glycidyl methacrylate or maleic anhydride.

18. Film according to claim 17, characterized in that the terpolymer consists of at least 65–96% by weight of ethylene units and at most 3–34% by weight of acrylate or methacrylate units and 1–10% by weight of glycidyl methacrylate or maleic anhydride units.

19. Film according to claim 17, characterized in that the terpolymer has a melting point of 40–120° C. and a melt flow index of 0.1–20 g/10 min (at 190° C. and 21.6 N).

20. Film according to claim 1, characterized in that the interlayer comprises an additive in an amount of from 0.5 to 30% by weight.

21. Film according to claim 20, characterized in that the additive is a wax and/or polyethylene.

22. Film according to claim 1, wherein the first interlayer has a thickness of from 1 to 15 μm.

23. Film according to claim 1, characterized in that the film has a second polyolefinic top layer on the opposite surface of the base layer.

24. Film according to claim 23, characterized in that the polyolefin of the second top layer comprises a propylene homopolymer and/or a copolymer comprising ethylene, propylene or butylene units and/or a terpolymer comprising ethylene, propylene and butylene units.

25. Film according to claim 23, characterized in that a second polyolefinic interlayer has additionally been applied beneath the second top layer.

26. Film according to claim 1, characterized in that the base layer is transparent or opaque or white and opaque.

27. Film according to claim 1, characterized in that the thickness of the film is from 15 to 150 μm and where the base layer makes up at least 40% of the total thickness.

28. Film according to claim 1, characterized in that the base layer comprises antistatic.

29. Film according to claim 1, characterized in that the additive is present in the top layer from 0.5 to 10% by weight, and the copolymer is present in the top layer in an amount of 90–99.5% based on the weight of the top layer and the additive is a polyethylene wax, a macrocrystalline paraffin or a microcrystalline wax (microwax).

30. Film according to claim 29, characterized in that the wax has a mean molecular weight Mn (number average) Mn of from 400 to 2000, and the wax has a melting point of from 70 to 150° C. and the polyethylene is a HDPE, LDPE, LLDPE, MDPE or VLDPE.

31. Film according to claim 1, characterized in that the thickness of the film is from 25 to 90 μm and where the base layer makes up at least 40% of the total thickness and the base layer comprises a tertiary aliphatic amine.

32. The film as claimed in claim 1, wherein the film is a label film.

33. A process of labelling which comprises placing the film as claimed in claim 32 on a container without additional adhesive being used during the labelling.

34. The process as claimed in claim 33, wherein the container is made from PS, PP, PE, PVC, PET, glass or metal.

35. The process as claimed in claim 34, wherein the container is made from aluminum or tin plate.

36. The process as claimed in claim 35, wherein the container is labelled by the in-mould, thermolabelling, patch labelling or wrap-around labelling method.

37. The film as claimed in claim 1, wherein the film is a lid film or packaging film.

38. The film as claimed in claim 37, wherein the film is a packaging film for pulverulent pack contents.

39. The film as claimed in claim 38, wherein the film is heat-sealed for the production of packaging, and the heat-sealing is carried out at a temperature of from 70 to 100° C.

40. The film as claimed in claim 38, wherein the surface of the first top layer is heat-sealed to PVDC or acrylate lacquer.

41. The film as claimed in claim 1, wherein the film is a lamination film.

42. A process to laminate a film which comprises laminating the lamination film as claimed in claim 41 to paper, wood, metal or thermoplastic films.

43. The process as claimed in claim 42, wherein the metal is aluminium.

44. The film according to claim 1, wherein the film is used in printing, metallization or coatings.

45. The film according to claim 1, wherein the film is used in cold-sealing adhesive coatings.

46. Process for the production of a polyolefin film according to claim 1 by the coextrusion process, in which the melts corresponding to the individual layers of the film are coextruded simultaneously and jointly through a flat-film die, the resultant film is, for solidification, taken off on one or more roll(s), the multilayered film is subsequently stretched, and the stretched film is heat-set, characterized in that the longitudinal stretching of the film is carried out by means of heated rolls, and the temperature during the longitudinal stretching is varied in a range of 10° C. above or below the melting point of the copolymer I of the first top layer.

47. Multilayered, biaxially oriented polyolefin film comprising a base layer and at least one first interlayer and a first top layer applied to this interlayer, characterized in that this first interlayer is built up from a terpolymer which consists of three different monomers (a), (b) and (c), where (a) is an olefin and (b) is an unsaturated carboxylic acid or an ester thereof and (c) is a carboxylic acid ester which is different from (b) or a carboxylic anhydride, and the first top layer comprises a copolymer which consists of an olefin and an unsaturated carboxylic acid or esters thereof, and this first top layer additionally comprises an additive in an amount of from 30 to 50% by weight, where the data in % by weight are in each case based on the weight of the top layer.

48. The film as claimed in claim 47, wherein the film is a protective film.

49. The film as claimed in claim 48, wherein the film is protecting a glass, metal, ceramic, plastic or wood surface.

* * * * *